US007601190B2

(12) United States Patent
Howe et al.

(10) Patent No.: US 7,601,190 B2
(45) Date of Patent: Oct. 13, 2009

(54) AIR FILTER SYSTEM

(75) Inventors: Thomas Howe, Esslingen (DE); Wolfgang Lewerenz, Weinstadt (DE); Berndt Schütz, Stuttgart (DE)

(73) Assignee: Daimler AG, Stuttgart (DE)

( * ) Notice: Subject to any disclaimer, the term of this patent is extended or adjusted under 35 U.S.C. 154(b) by 513 days.

(21) Appl. No.: 11/496,957

(22) Filed: Aug. 1, 2006

(65) Prior Publication Data

US 2007/0000220 A1 Jan. 4, 2007

Related U.S. Application Data

(63) Continuation-in-part of application No. PCT/EP2005/000854, filed on Jan. 28, 2005.

(30) Foreign Application Priority Data

Feb. 2, 2004 (DE) ....................... 10 2004 005 176
Mar. 30, 2004 (DE) ....................... 10 2004 015 331

(51) Int. Cl.
*B01D 46/00* (2006.01)

(52) U.S. Cl. .......................... 55/385.3; 96/380; 96/383; 96/381; 96/384; 96/386

(58) Field of Classification Search ................ 55/385.3, 55/490, DIG. 28; 96/380, 383, 381, 384, 96/386, 414–416; 123/198 E, 519; 180/68.3; 248/311.2; 181/229, 231
See application file for complete search history.

(56) References Cited

U.S. PATENT DOCUMENTS

| | | | | |
|---|---|---|---|---|
| 6,550,440 | B1 | 4/2003 | Vresk et al. | |
| 6,551,389 | B2 * | 4/2003 | Spannbauer et al. | 96/380 |
| 6,761,748 | B2 * | 7/2004 | Schenk et al. | 55/385.3 |
| 6,852,151 | B2 * | 2/2005 | Bloomer | 96/386 |
| 6,881,237 | B2 * | 4/2005 | Storz et al. | 55/385.3 |
| 7,141,101 | B2 * | 11/2006 | Amann | 96/380 |
| 7,470,312 | B2 * | 12/2008 | Ohya et al. | 96/386 |
| 2002/0040827 | A1 | 4/2002 | Kraft et al. | |
| 2003/0010566 | A1 | 1/2003 | Miyakawa et al. | |

FOREIGN PATENT DOCUMENTS

| | | |
|---|---|---|
| DE | 23 42 154 | 2/1975 |
| DE | 44 15 636 | 11/1994 |
| DE | 198 27 410 | 1/1999 |
| DE | 103 22 168 | 12/2003 |

* cited by examiner

*Primary Examiner*—Duane Smith
*Assistant Examiner*—Minh-Chau T Pham
(74) *Attorney, Agent, or Firm*—Klaus J. Bach

(57) ABSTRACT

In an air filter system for an internal combustion engine having a fresh air line with an air inlet, a filter housing with an upper housing half and lower housing half, a filter element disposed in the filter housing, a clean air outlet opening with an adjoining clean air line opening into the intake system of the internal combustion engine, and means for damping intake noise, the means for damping the intake noise is a sheet configured and arranged adjacent, and clamped to, the upper housing half opposite the clean air outlet whereby the intake noise vibration energy is absorbed by frictional relative movement between the sheet and the upper housing half, the intake noise being damped by a change in impedance, in particular by a jump in impedance.

8 Claims, 5 Drawing Sheets

AIR FILTER SYSTEM

This is a Continuation-In-Part Application of International Application PCT/EP2005/000854 filed Jan. 28, 2005 and claiming the priorities of German applications 10 2004 005 176.3 filed Feb. 2, 2004 and 102 004 015 331.0 filed Mar. 30, 2004.

BACKGROUND OF THE INVENTION

The invention relates to an air filter system for a reciprocating piston internal combustion engine with an air filter disposed in a filter housing connected to a clean air line extending to the engine air intake system and means for damping the air intake noise.

DE 23 42 154 A1 discloses a noise damping air filter element for reducing the air intake noise, in particular for compressors and air induction machines in which a two-component housing forms an ellipse in a longitudinal section, and in which two housing halves are each filled with open-pore PUR foam beyond the focal point of the ellipse and connected in a seal-forming fashion.

The total noise of a motor vehicle is mainly made up of the noise sources of the intake system, engine, exhaust system, power transmission system, chassis, fans and tires. In addition to the attention being paid both to reducing the noise emissions from the various noise sources of a motor vehicle attention is increasingly given to the damping of the noise generated by the air filter system at the air intake side. The noises generated in the internal combustion engines result essentially from engine vibrations, internal pressure pulsations and the combustion process. The intake noises, such as, for example, internal pressure pulsations which travel out of the engine and to the air filter through the air intake manifold, hot film air mass flow rate meter (HFM) and air lines, are usually damped by resonators and by a corresponding air filter volume. However, this damping is not sufficient and the wall of the air filter nevertheless emits noise which travels into the passenger compartment. So-called large-area voluminous mats of damping material are frequently used in the air filters in order to reduce or eliminate this kind of noise emissions. However, these have the disadvantage that they have to cover a relatively large area and are relatively expensive and space-consuming.

It is therefore an object of the present invention to provide an air filter system in which intake noises are damped within a relatively small space and which can be manufactured at comparatively little expenditures.

SUMMARY OF THE INVENTION

In an air filter system for an internal combustion engine comprising a fresh air line with an air inlet, a filter housing with an upper housing half and lower housing half, a filter element disposed in the filter housing, a clean air outlet opening with an adjoining clean air line opening into the intake system of the internal combustion engine, and means for damping intake noise, the means for damping the intake noise is configured and arranged in such a way that, on the other hand, the intake noise is absorbed by joint patch damping and, on the other hand, the intake noise is damped by a change in impedance, in particular by a jump in impedance.

In a particular embodiment of the air filter system, the means for damping or reducing noise is arranged on the side of the upper filter housing half disposed opposite the clean air outlet opening.

In an alternative embodiment, the geometric shape of the means for damping or reducing noise is adapted to the geometric shape of the upper filter housing half.

Preferably, the means for damping or reducing noise is composed of metal.

In one advantageous embodiment of the invention, the means for damping or reducing noise comprises a plate with a thickness of less than 1 mm.

Preferably, the surface of the plate is greater than, or at least approximately equal to, the surface of the clean air outlet opening.

Advantageously, the plate can be clamped against the wall of the upper filter housing half by means of a flow straightener.

Further features and advantageous embodiments of the invention will become apparent from the following description of the invention on the basis of the accompanying drawings:

DESCRIPTION OF A PARTICULAR EMBODIMENT

Figure 1:
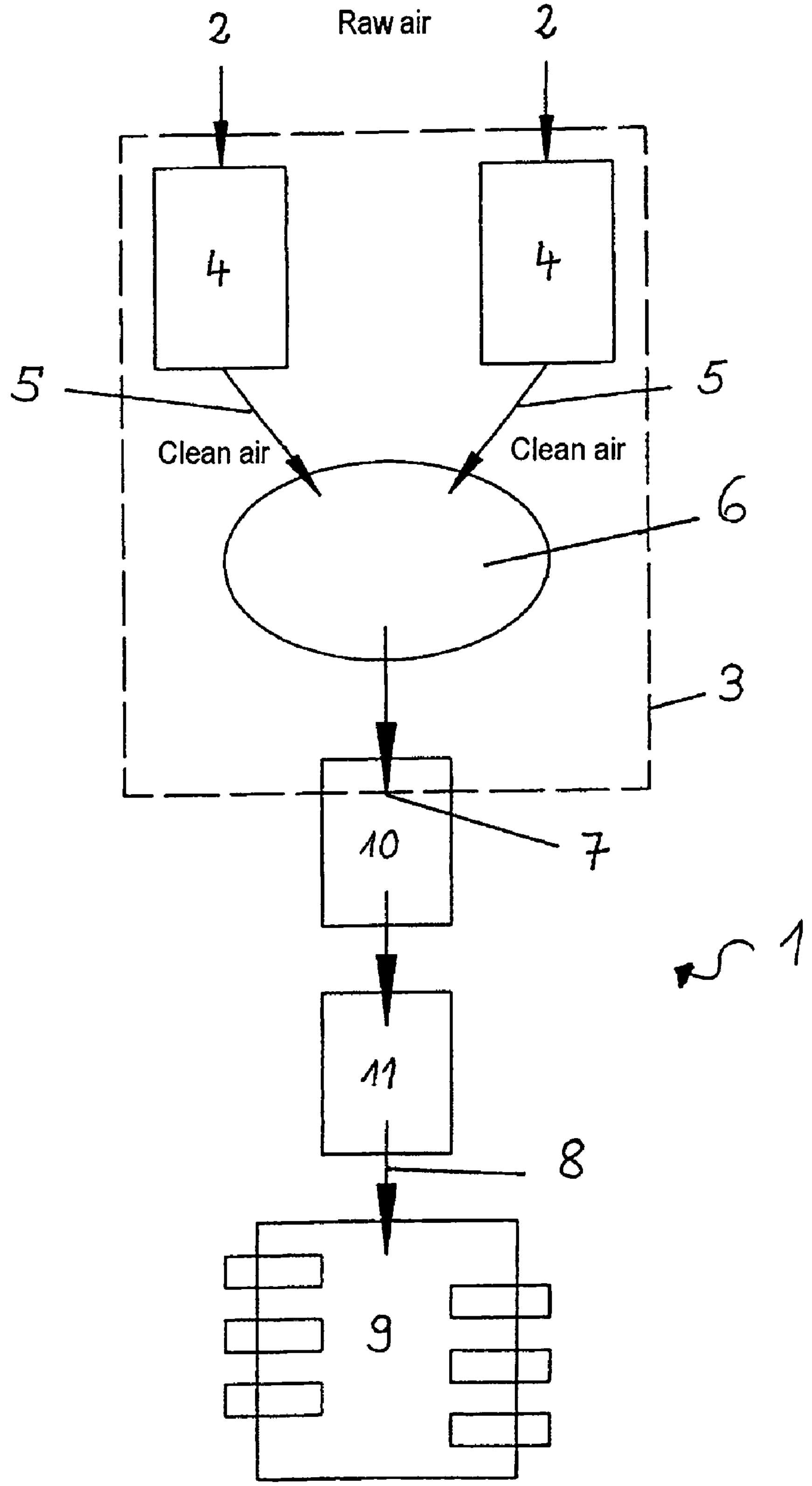
FIG. 1 shows schematically an air filter system according to the invention.
Figure 2:
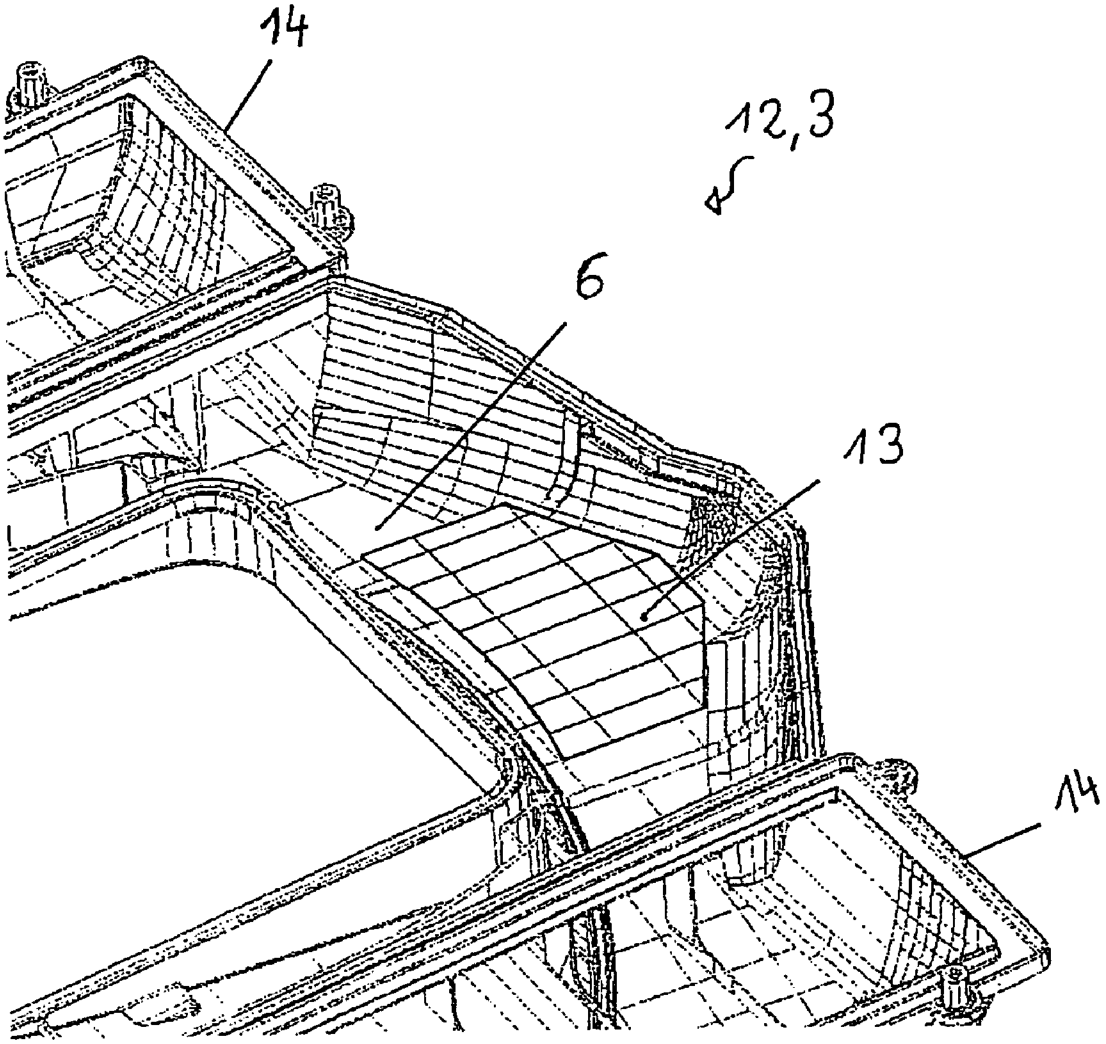
FIG. 2 is a perspective view of an air filter upper part with a plate according to the invention for damping or reducing noise.
Figure 3:
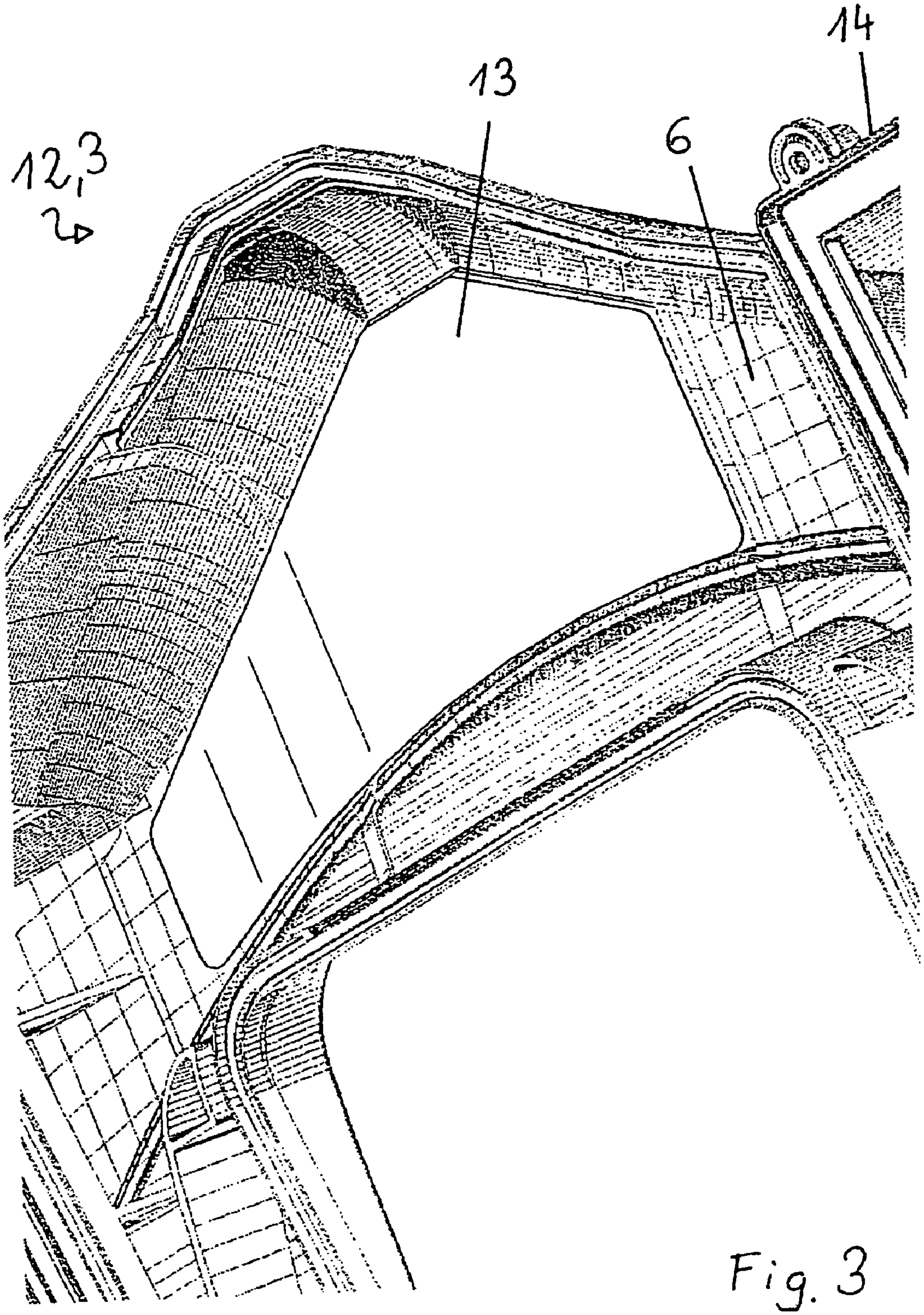
FIG. 3 is a further perspective view of an air filter upper part with a relatively large plate according to the invention for damping or reducing noise.

FIG. 1 is a highly simplified illustration of an air filter system 1 according to the invention for internal combustion engines of the reciprocating piston type. The air filter system 1 comprises at least one fresh air line 2 with an air inlet, preferably two such lines, each with an air inlet, a filter housing 3 with an upper housing half 12, as illustrated in FIGS. 2 and 3, and a lower housing half (not shown), and at least one filter element 4, preferably two filter elements, which remove impurities and particles from the sucked in fresh air in order to ensure proper operation of the engine. The air which is pre-cleaned in this way, referred to below as clean air, flows via clean air ducts 5 in the filter housing 3 into a so-called air straightener collection volume 6 in which a means according to the invention for damping or reducing intake noise (not illustrated separately) is located. Thereafter, the clean air flows via at least one clean air outlet opening 7 of the air filter 3 into an adjoining clean air line 8 which opens into an intake system 9 of a reciprocating piston internal combustion engine. A hot film air mass flow rate meter (HFM) 10 and an inlet gas flow controller 11 (electronic throttle) is preferably also arranged between the clean air outlet opening 7 and intake manifold 9 of the internal combustion engine.

FIGS. 2 and 3 each show a perspective view of an upper housing half 12 of an air filter housing 3. For the sake of clarity, the same reference symbols are used for functionally identical or identically acting components. In this respect, reference can be made to the above description with respect to FIG. 1. The means 13 for damping or reducing intake noise is arranged according to the invention on the upper filter housing half 12 opposite the clean air outlet opening (not shown) and is located in the so-called rectifier collecting volume 6. The means 13 is preferably made of metal. The means 13 particularly preferably comprises a metal plate with a thickness of less than 1 mm, preferably less than 0.6 mm. The surface of such a metal plate can, as illustrated in FIGS. 2 and 3, be greater than, or approximately equal to, that of the clean air outlet opening which lies opposite the plate 13. The geometric shape of the plate 13 is, as shown in FIGS. 2 and 3, adapted to the geometric shape of the upper filter housing half 12. To the right and left next to the flow straightener collection volume 6 there are preferably two air filter cartridge cases 14 in which the actual air filter elements (not illustrated) for cleaning the fresh air are located.

Figure 4:
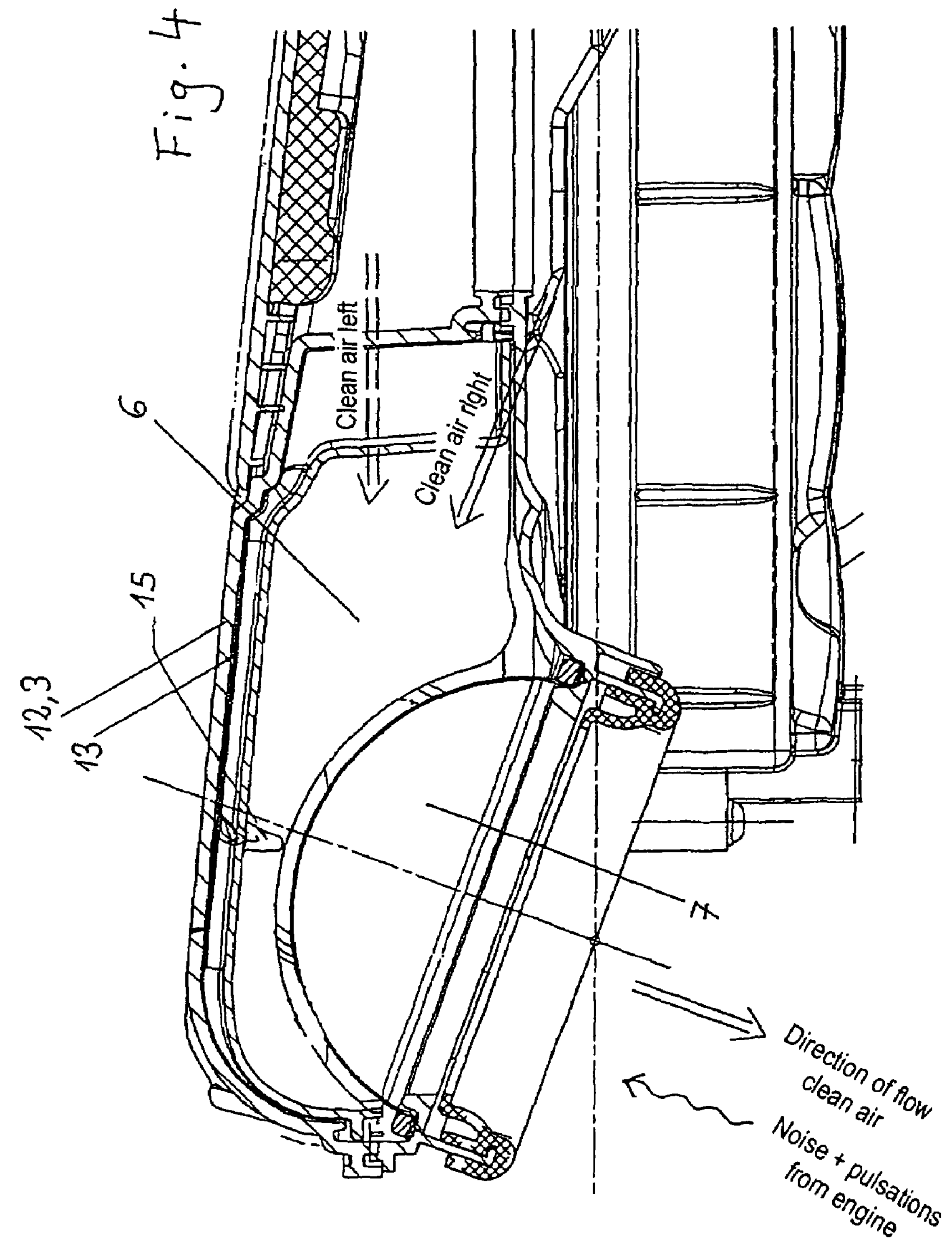
FIG. 4 shows a cross-section through an air filter with a plate according to the invention for damping or reducing noise.
Figure 5A:
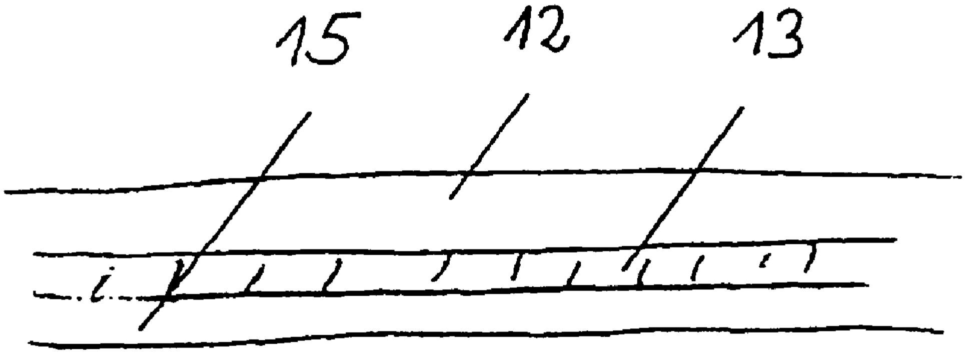
FIG. 5*a* shows schematically a cross-section through an air filter which is not subjected to stress.
Figure 5B:
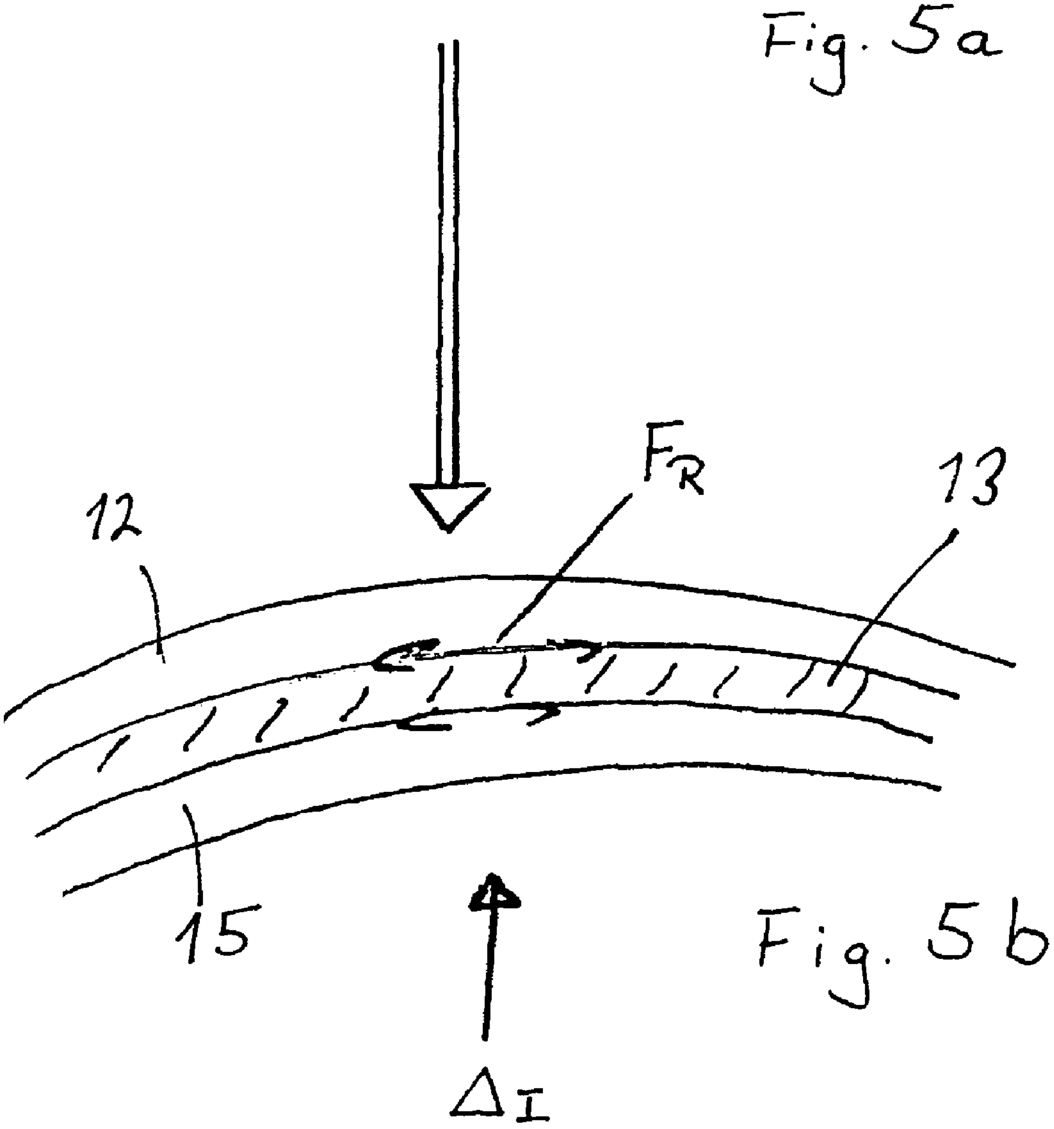
FIG. 5*b* shows schematically a cross-section through an air filter which is subjected to stress (deformation).

FIG. 4 illustrates a cross-section through an air filter housing 3 with means 13 for damping or reducing noise which means are configured and arranged in accordance with the invention. The large-area and voluminous plate made of damping material which is usually used is advantageously replaced by a small metal plate 13 which is located between the wall of the upper housing half 12 of the air filter housing 3 and a flow straightener 15 opposite the air outlet opening 7. The metal plate 13 is held by the flow straightener 15 and preferably made of plastic which is described in more detail in DE 103 140 20 A1, and is held in such a way that the metal plate 13 or the piece of sheet metal is clamped against the wall of the upper filter housing half 12 by means of the flow straightener 15, the flow straightener 15 being welded to the filter wall 12 only at particular locations. As illustrated in FIG. 5*a*, this means that the damping element 13 is located sandwiched between the filter wall 12 and the flow straightener 15 and is held only by the clamping connection. When oscillations (vibrations) are generated in the filter wall 12, for example, due to pressure pulsations and the component is inevitably deformed as a result, as shown in FIG. 5*b*, this "loose" contact leads to relative movement or displacements of the damping element 13 in the tangential direction between the filter wall 12 and the flow straightener 15, whereby energy is dissipated. The dissipation of energy, i.e. oscillation damping, is thus due to frictional forces $F_R$ generated by the frictional contact. This type of damping is also referred to as joint patch damping.

Furthermore, the sandwich-like arrangement of material which reflects sound well and material which reflects sound poorly, i.e. the damping element 13 and filter wall 12 or flow straightener 15 at which a change in impedance $\Delta_I$, in particular a jump in impedance, occurs, also advantageously leads to a reduction in the noise level arising during operation of the engine due, for example, to pressure pulsations. Such an arrangement also exhibits high sound-reducing properties.

The principle of the damping of sound by an impedance jump $\Delta_I$ is illustrated in FIG. 5*b*, which indicates relative vibrational movement $F_R$ between the damping element 13 and the walls 12 and 15.

Both physical effects in conjunction with the shape and weight of the damping element 13 thus advantageously lead to a high, optimum sound-damping effect at the noise levels caused by intake noises, in particular by pressure pulsations. In addition to a low additional weight and to the small space required for installation, the metal plate 13 which is used for a damping element also advantageously incurs only low costs for procurement and installation in the air filter housing.

What is claimed is:

1. An air filter system (1) for reciprocating piston internal combustion engines, comprising a fresh air supply line (2) with an air inlet, a filter housing (3) with an upper housing half (12) and lower housing half, said housing (3) including a filter element (4), a clean air outlet opening (7) with an adjoining clean air line (8) which opens into an intake manifold (9) of the reciprocating piston internal combustion engine, and means (13) for damping air intake noises, said means (13) for damping air intake noises being a sheet (13) configured and arranged adjacent to, and clamped against, the housing half (12) of the filter housing (3) opposite the clean air outlet opening (7) whereby the intake noise is absorbed by sudden changes in impedance of the inlet air resulting in relative frictional movement of the sheet (13) relative to the housing half (12).

2. The air filter system as claimed in claim 1, wherein the change in impedance is a sudden increase in the impedance.

3. The air filter system as claimed in claim 1, wherein the geometric shape of the means (13) for damping or reducing noise is adapted to the geometric shape of the upper filter housing half (12).

4. The air filter system as claimed in claim 3, wherein the means (13) for damping noise is composed of metal.

5. The air filter system as claimed in claim 4, wherein the means (13) for damping noise comprises of a sheet having a thickness of less than 1 mm.

6. The air filter system as claimed in claim 5, wherein the surface area of the sheet (13) is at least approximately equal to the cross-section of the clean air outlet opening (7).

7. The air filter system as claimed in claim 6, wherein the surface area of the sheet (13) is greater than the cross-section of the clean air outlet opening.

8. The air filter system as claimed in claim 5, wherein the sheet (13) is clamped against the wall of the upper filter housing half (12) by means of a flow straightener (15).

* * * * *